United States Patent
Sakaguchi

(10) Patent No.: US 11,521,484 B2
(45) Date of Patent: Dec. 6, 2022

(54) SETTING DEVICE, CONTROL DEVICE, AND RECORDING MEDIUM USED WITH MANIPULATION DEVICE FOR CONTROLLING APPLIANCE

(71) Applicant: Panasonic Intellectual Property Management Co., Ltd., Osaka (JP)

(72) Inventor: Keiji Sakaguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/258,774

(22) PCT Filed: Jun. 6, 2019

(86) PCT No.: PCT/JP2019/022479
§ 371 (c)(1),
(2) Date: Jan. 8, 2021

(87) PCT Pub. No.: WO2020/012836
PCT Pub. Date: Jan. 16, 2020

(65) Prior Publication Data
US 2021/0304588 A1  Sep. 30, 2021

(30) Foreign Application Priority Data
Jul. 11, 2018 (JP) .............................. JP2018-131651

(51) Int. Cl.
G08C 17/02 (2006.01)
G06F 21/44 (2013.01)

(52) U.S. Cl.
CPC ............. *G08C 17/02* (2013.01); *G06F 21/44* (2013.01)

(58) Field of Classification Search
CPC ................ G08C 17/02; G08C 2201/20; G08C 2201/21; G08C 2201/40; G08C 2201/42;
(Continued)

(56) References Cited

U.S. PATENT DOCUMENTS 5,852,478 A * 12/1998 Kwoh .................... H04N 5/782
386/234
6,133,847 A * 10/2000 Yang ................... G05B 19/0426
348/176

(Continued)

FOREIGN PATENT DOCUMENTS

JP  2016-134792 A  7/2016

OTHER PUBLICATIONS

International Search Report for corresponding Application No. PCT/JP2019/022479, dated Jul. 30, 2019.

*Primary Examiner* — Edwin C Holloway, III
(74) *Attorney, Agent, or Firm* — Renner, Otto, Boisselle & Sklar, LLP

(57) ABSTRACT

A setting device sets a manipulation device that transmits a wireless signal for controlling an appliance when the manipulation device accepts manipulation from a manipulator. An input unit receives first identification information, second identification information, and registration information. An authentication unit performs an authentication process on the registration information received. An output unit outputs a combination of the first identification information and the second identification information received when the authentication process is successful. The wireless signal transmitted from the manipulation device includes the first identification information, the second identification information, and command information.

7 Claims, 6 Drawing Sheets

| REGISTRATION INFORMATION | FIRST IDENTIFICATION INFORMATION | SECOND IDENTIFICATION INFORMATION | APPLIANCE | COMMAND INFORMATION |
|---|---|---|---|---|
| A1 | B1 | C1 | D1 | E1 |
| A2 | B2 | C2 | D2 | E2 |
| ⋮ | ⋮ | ⋮ | ⋮ | ⋮ |

(58) Field of Classification Search
CPC ...... G08C 2201/61; G06F 21/44; H04Q 9/00; H05B 47/00
USPC ............................................. 340/4.3, 12.28
See application file for complete search history.

(56) References Cited

U.S. PATENT DOCUMENTS

| | | | | |
|---|---|---|---|---|
| 6,211,870 | B1* | 4/2001 | Foster | G08C 19/28 348/E5.103 |
| 2002/0033760 | A1* | 3/2002 | Kobayashi | H04W 28/18 709/218 |
| 2002/0140569 | A1* | 10/2002 | van Ee | G08C 19/28 340/12.23 |
| 2003/0233664 | A1* | 12/2003 | Huang | G08C 19/28 725/132 |
| 2004/0263377 | A1* | 12/2004 | Risi | G08C 17/00 348/E5.103 |
| 2007/0052548 | A1* | 3/2007 | Hankin | G08C 17/02 340/5.61 |
| 2007/0063860 | A1* | 3/2007 | Escobosa | H04N 21/4782 340/4.31 |
| 2008/0044006 | A1* | 2/2008 | Kitagawa | H04L 12/66 379/433.01 |
| 2010/0329689 | A1* | 12/2010 | Sin | G08C 23/04 398/115 |

* cited by examiner

FIG.2

| FIRST IDENTIFICATION INFORMATION | SECOND IDENTIFICATION INFORMATION | COMMAND INFORMATION |
|---|---|---|

FIG.3

| REGISTRATION INFORMATION | FIRST IDENTIFICATION INFORMATION | SECOND IDENTIFICATION INFORMATION | APPLIANCE | COMMAND INFORMATION |
|---|---|---|---|---|
| A1 | B1 | C1 | D1 | E1 |
| A2 | B2 | C2 | D2 | E2 |
| ⋮ | ⋮ | ⋮ | ⋮ | ⋮ |

212

1000

| REGISTRATION INFORMATION | FIRST IDENTIFICATION INFORMATION | SWITCH | SECOND IDENTIFICATION INFORMATION | APPLIANCE | COMMAND INFORMATION |
|---|---|---|---|---|---|
| F1 | G1 | H1 | I1 | J1 | K1 |
|  |  | H2 | I2 | J2 | K2 |
| ⋮ | ⋮ | ⋮ | ⋮ | ⋮ | ⋮ |

| FIRST IDENTIFICATION INFORMATION | SECOND IDENTIFICATION INFORMATION | MODE IDENTIFICATION INFORMATION |
|---|---|---|

FIG.9

FIRST IDENTIFICATION INFORMATION : L1
SECOND IDENTIFICATION INFORMATION : M1

|  | FIRST MODE | SECOND MODE |
|---|---|---|
| FIRST APPLIANCE | N1 | N2 |
| SECOND APPLIANCE | O1 | O2 |
| THIRD APPLIANCE | P1 | P2 |

512

SETTING DEVICE, CONTROL DEVICE, AND RECORDING MEDIUM USED WITH MANIPULATION DEVICE FOR CONTROLLING APPLIANCE

TECHNICAL FIELD

The present disclosure relates to a setting device, a control device, and a program used with a manipulation device for controlling an appliance.

BACKGROUND ART

When the manipulation unit of a manipulation device is manipulated to control illumination remotely, the manipulation device transmits a wireless signal to the control device connected to the illuminating device. The wireless signal includes transmission source information, transmission destination information, and command information. When the control device receives the wireless signal, the control device controls the state of the illuminating device in accordance with the command information (see, for example, patent document 1).
[Patent Literature 1] JP2016-134792

SUMMARY OF INVENTION

Technical Problem

If the interface for the wireless signal transmitted from the manipulation device is common to a plurality of types of appliances, it is possible to use the manipulator for the respective of types of appliances. Meanwhile, in order to simplify the configuration of the manipulation device, the manipulation device may be adapted to control only appliance. It is therefore desired to expand the flexibility of control by the manipulation device, while at the same time inhibiting the configuration of the manipulation device from becoming complicated.

The present disclosure addresses the above-described issue, and an illustrative purpose thereof is to expand the flexibility of control by the manipulator, while at the same inhibiting the configuration of the manipulation device from becoming complicated.

Solution to Problem

A setting device adapted to set a manipulation device that transmits a wireless signal for controlling an appliance when the manipulation device accepts manipulation from a manipulator, including: an input unit that receives first identification information for identifying the manipulation device, second identification information for identifying the appliance, and registration information for identifying a manipulating personnel; an authentication unit that performs an authentication process on the registration information received in the input unit; and an output unit that outputs a combination of the first identification information and the second identification information received in the input unit to the manipulation device when the authentication process in the authentication unit is successful. The wireless signal transmitted from the manipulation device includes the first identification information, the second identification information, and command information for controlling the appliance.

Another embodiment of the present disclosure relates to a control device. The device is a control device adapted to control a plurality of appliances based on a wireless signal from a manipulation device that accepts manipulation from a manipulating personnel, including: a first communication unit that receives from the manipulation device the wireless signal including first identification information for identifying the manipulation device and second identification information for identifying the control device; an acquisition unit that acquires command information for each of the plurality of appliances based on the first identification information and the second identification information included in the wireless signal received in the first communication unit; and a second communication unit that transmits, to each of the plurality of appliances, the command information acquired in the acquisition unit and provided for each of the plurality of appliances.

Optional combinations of the aforementioned constituting elements, and implementations of the present disclosure in the form of methods, devices, systems, computer programs, recording mediums recording computer programs, etc. may also be practiced as additional modes of the present disclosure.

Advantageous Effects of Invention

According to the present disclosure, it is to possible to expand the flexibility of control by the manipulator, while at the same inhibiting the configuration of the manipulation device from becoming complicated.

BRIEF DESCRIPTION OF DRAWINGS

FIG. 2 shows a format of the wireless signal in the remote manipulation system of FIG. 1;
FIG. 3 shows a data structure of a table stored in the storage unit of FIG. 1;
FIG. 8 shows a format of the wireless signal in the remote manipulation system of FIG. 7;
and
FIG. 9 shows a data structure of a table stored in the storage unit of FIG. 1.

DESCRIPTION OF EMBODIMENTS

Embodiment 1

Figure 1:
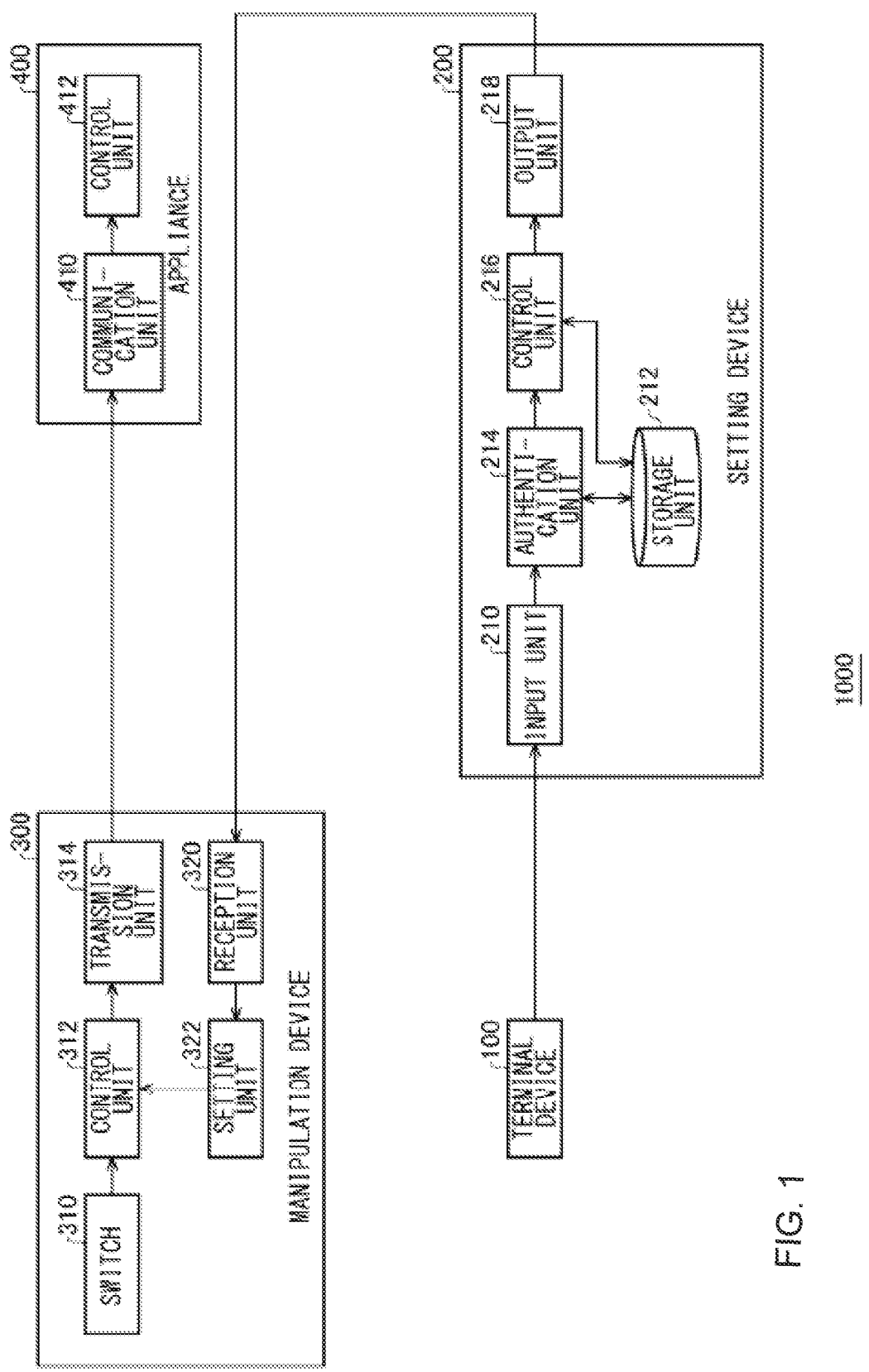
FIG. 1 shows a configuration of a remote manipulation system according to embodiment 1.

A summary of this embodiment will be given before describing the embodiments of the present disclosure in specific details. The embodiment relates to a remote manipulation system for remotely manipulating appliances installed at a customer's site such as a residence, by using a manipulation device. The appliances may include an air conditioner, a illuminating device, a shutter, etc. The manipulation device may be remote controller and includes a switch and a wireless communication function. For wireless communication, infrared communication or near field communication is used by way of example. When the switch of the manipulation device is manipulated by a manipulator, the manipulation device transmits a wireless signal. When the appliance receives the wireless signal, the appliance performs a process in accordance with the wireless signal. The wireless signal includes identification information for identifying the manipulation device originating the signal (hereinafter, "first identification information") and identification information for identifying the destination appliance (hereinafter, "second identification information") to prevent false manipulation. Further, the identification information includes command information for designating an operation of the appliance.

If the specification of the wireless communication function is common to a plurality of appliances, it will be possible to use a manipulation device used for a given appliance for another appliance. In that process, the second identification information stored in the manipulation device and the first identification information stored in the device need be changed. To simplify the configuration of the manipulation device, however, the first identification information and the second identification information are stored in the manipulation device before use, and it is not assumed that the information is changed. A change may be enabled, but then it is desired that persons authorized to make a change are restricted in order to prevent the security from being weakened.

The remote manipulation system according to this embodiment includes a setting device capable of communicating with the manipulation device and also capable of communicating with a terminal device such as a smartphone, etc. The setting device registers identification information (hereinafter, "registration information") for identifying a setting personnel who can set the manipulation device. The setting personnel manipulates the terminal device and transmits the registration information, the first identification information, and the second identification information to the setting device. At least one of the first identification information or the second identification information is subject to change. The setting device performs an authentication process on the registration information. When the authentication process is successful, the setting device stores the combination of the first identification information and the second identification information and transmits the combination to the manipulation device. When the manipulation device receives the combination from the setting device, the manipulation device stores the combination.

FIG. 1 shows a configuration of a remote manipulation system 1000. The remote manipulation system 1000 includes a terminal device 100, a setting device 200, a manipulation device 300, and an appliance 400. The setting device 200 includes an input unit 210, a storage unit 212, an authentication unit 214, a control unit 216, and an output unit 218. The manipulation device 300 includes a switch 310, a control unit 312, a transmission unit 314, a reception unit 320, and a setting unit 322. The appliance 400 includes a communication unit 410 and a control unit 412. Hereinafter, the (1) basic operation of the remote manipulation system 1000 will be described, and then the (2) setting operation thereof will be described.

(1) Basic Operation

The switch 310 of the manipulation device 300 is, for example, a button that can be pushed down. The manipulator pushes the switch 310 down to manipulate the appliance 400. When the switch 310 detects a push-down operation, the switch 310 notifies the control unit 312 of the push-down operation. When notified of the push-down operation, the control unit 312 generates a wireless signal for controlling the appliance 400. FIG. 2 shows a format of the wireless signal in the remote manipulation system 1000. As shown in the figure, the wireless signal includes the first identification information, the second identification information, and the command information. As described above, the first identification information is information for identifying the manipulation device 300 originating the wireless signal, and the second identification information is information for identifying the appliance 400 to which the wireless signal is transmitted.

The command information is information for controlling the appliance 400. For example, the command information indicates that the operation of the appliance 400 should be turned on. Like a toggle switch, the command information may alternately turn the operation of the appliance 400 on and turn the operation of the appliance 400 off every time the push-down operation is communicated. The appliance 400 can perform a plurality of types of operations, and command information corresponding to each operation is defined. To simplify the configuration of the manipulation device 300, on the other hand, some (e.g., one) of a plurality of types of command information are set in the control unit 312, and the command information thus set is included in the wireless signal. Reference is made back to FIG. 1. The control unit 312 outputs the wireless signal to the transmission unit 314. The transmission unit 314 receives the wireless signal from the control unit 312. The transmission unit 314 can perform infrared communication, near field communication, etc. and transmits the wireless signal.

The communication unit 410 of the appliance 400 is compatible with the same communication scheme as that of the transmission unit 314 of the manipulation device 300 and receives the wireless signal from the manipulation device 300. The communication unit 410 acquires the first identification information, the second identification information, and the command information from the wireless signal and outputs the first identification information, the second identification information, and the command information to the control unit 412. The control unit 412 stores the first identification information and the second identification information in advance and compares the first identification information and the second identification information thus stored with the first identification information and the second identification information received from the communication unit 410. If a match is not found in at least one of the types of information, the control unit 412 terminates the process. This represents an operation performed when the wireless signal is received from the manipulation device 300 that is not set in advance. When a match is found in both of the two types of information, on the other hand, the control unit 412 controls the operation of the appliance 400 in accordance with the command information received from the communication unit 410. A publicly known technology may be used for this, and a description thereof is omitted.

(2) Setting Operation

The terminal device 100 is a communication device such as a smartphone. The terminal device 100 can run a preinstalled application program. The setting personnel runs the application program and logs into the application program by using registration information. Registration information is information for identifying the setting personnel. The setting personnel inputs at least one of the first identification information, the second identification information, and the command information that should be changed. The terminal device 100 transmits a signal (hereinafter, "registration request") including the first identification information, the second identification information, the registration information, and the command information to the setting device 200.

The setting device 200 sets the manipulation device 300. The input unit 210 of the setting device 200 can communicate with the terminal device 100 and receives the registration request from the terminal device 100. At least one of the first identification information, the second identification information, or the command information is subject to setting. The command information in this case is command information that is one of the types of command information that can be included in the wireless signal and that should be used in the manipulation device 300 and the appliance 400. The input unit 210 outputs these items of information to the authentication unit 214.

The storage unit 212 stores the registration information already registered and the first identification information etc. related to the registration information. FIG. 3 shows a data structure of a table stored in the storage unit 212. As shown in the figure, the registration information, the first identification information, the second identification information, the appliance 400, and the command information are associated with each other. Reference is made back to FIG. 1. The authentication unit 214 performs an authentication process on the registration information received in the input unit 210 by referring to the table stored in the storage unit 212. For example, when the registration information received in the input unit 210 is included in the table, the authentication unit 214 determines that the authentication process is successful. When the registration information received in the input unit 210 is not included in the table, on the other hand, the authentication unit 214 determines that the authentication process is a failure. The authentication process is not limited to the process as described above. When the authentication process fails, the authentication unit 214 terminates the process. When the authentication process is successful, on the other hand, the authentication unit 214 outputs the information received from the input unit 210 to the control unit 216.

When the authentication process in the authentication unit 214 is successful, the control unit 216 updates the table stored in the storage unit 212 with the information received from the input unit 210. In the case the second identification information and the command information are changed, for example, the control unit 216 changes, in the table, the second identification information and the command information associated with the registration information received in the input unit 210. When the authentication process in the authentication unit 214 is successful, the control unit 216 generates a signal (hereinafter, "setting signal") including the first identification information, the second identification information, and the command information received from the input unit 210. The control unit 216 outputs the setting signal to the output unit 218. The output unit 218 can communicate with the manipulation device 300 and transmits the setting signal to the manipulation device 300.

The reception unit 320 of the manipulation device 300 receives the setting signal from the setting device 200. The reception unit 320 is compatible with the same communication scheme as that of the output unit 218. The communication schemes of the reception unit 320 and the transmission unit 314 may be identical or different. The reception unit 320 acquires the combination of the first identification information, the second identification information, and the command information from the setting signal and outputs the first identification information, the second identification information, and the command information to the setting unit 322. The setting unit 322 sets, in the control unit 312, the first identification information, the second identification information, and the command information received. The control unit 312 uses the first identification information, the second identification information, and the command information in the basic operation. When the first identification information or the second identification information is changed, the first identification information or the second identification information in the control unit 412 of the appliance 400 is also changed. A publicly known technology may be used to effect this change so that a description thereof is omitted.

The device, the system, or the entity that executes the method according to the disclosure is provided with a computer. By causing the computer to run a program, the function of the device, the system, or the entity that executes the method according to the disclosure is realized. The computer is comprised of a processor that operates in accordance with the program as a main hardware feature. The disclosure is non-limiting as to the type of the processor so long as the function is realized by running the program. The processor is comprised of one or a plurality of electronic circuits including a semiconductor integrated circuit (IC) or a large-scale integration (LSI). The plurality of electronic circuits may be integrated in one chip or provided in a plurality of chips. The plurality of chips may be aggregated in one device or provided in a plurality of devices. The program is recorded in a non-transitory recording medium such as a computer-readable ROM, optical disk, and hard disk drive. The program may be stored in a recording medium in advance or supplied to a recording medium via wide area communication network including the Internet.

Figure 4:
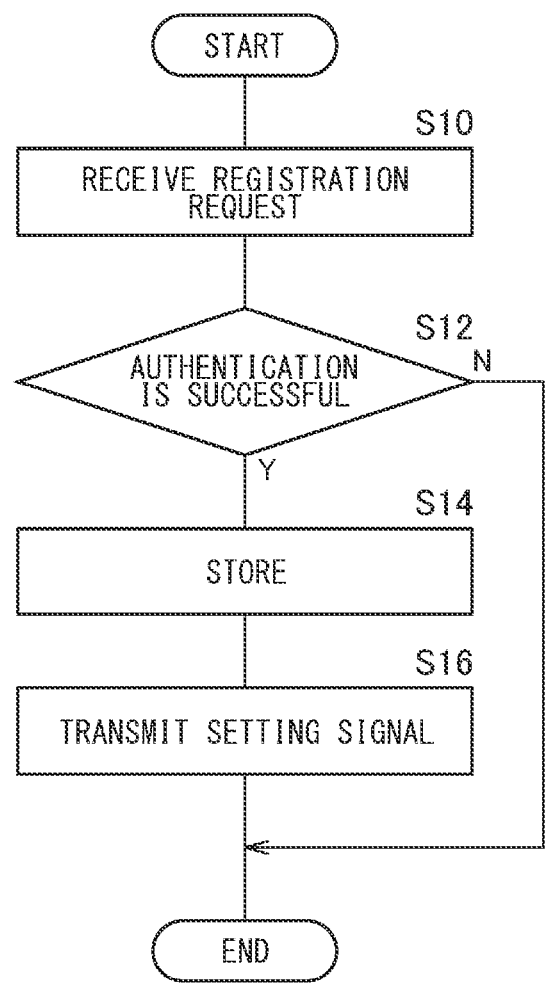
FIG. 4 is a flowchart showing a sequence of transmission by the setting device of FIG. 1.

A description will be given of the operation of the remote manipulation system 1000 having the configuration described above. FIG. 4 is a flowchart showing a sequence of transmission by the setting device 200. The input unit 210 receives the registration request (S10). When the authentication process is successful in the authentication unit (Y in S12), the storage unit 212 stores the first identification information (S14), and the control unit 216 transmits the setting signal (S16). When the authentication process is not successful in the authentication unit 214 (N in S12), the process is terminated.

According to this embodiment, the combination of the first authentication information and the second identification information is output to the manipulation device 300 when the authentication process on the received registration is successful. Therefore, at least one of the first identification information or the second identification information in the manipulation device 300 can be changed. Further, since at least one of the first identification information or the second identification information in the manipulation device 300 is changed when the authentication process on the received registration is successful, the security of the manipulation device 300 is improved. Further, the setting in the manipulation device 300 is changed in accordance with the setting signal output from the setting device 200. Therefore, the flexibility of control by the manipulation device 300 can be expanded, while at the same time the configuration of the manipulation device 300 is inhibited from becoming complicated. Further, the command information is output to the manipulation device 300 when the authentication process is successful. Therefore, the command information used can be changed. Further, the command information used can be changed so that the flexibility of control can be expanded.

A summary of an embodiment of the present disclosure is given below. A setting device 200 according to an embodiment of the present disclosure is a setting device 200 adapted to set a manipulation device 300 that transmits a wireless signal for controlling an appliance 400 when the manipulation device 300 accepts manipulation from a manipulator, including: an input unit 210 that receives first identification information for identifying the manipulation device 300, second identification information for identifying the appliance 400, and registration information for identifying a manipulating personnel; an authentication unit 214 that performs an authentication process on the registration information received in the input unit 210; and an output unit 218 that outputs a combination of the first identification information and the second identification information received in the input unit 210 to the manipulation device 300 when the authentication process in the authentication unit 214 is successful. The wireless signal transmitted from the manipulation device 300 includes the first identification information, the second identification information, and command information for controlling the appliance 400.

The input unit 210 receives one of types of command information that can be included in the wireless signal and that should be used, and the output unit 218 outputs the command information received in the input unit 210 to the manipulation device 300 when the authentication process in the authentication unit 214 is successful.

Embodiment 2

A description will now be given of embodiment 2. Like embodiment 1, embodiment 2 relates to a remote manipulation system. In embodiment 1, the manipulation device includes one switch and remotely controls one appliance. In embodiment 2, on the other hand, the manipulation device includes a plurality of switches and controls a plurality of appliances. The terminal device 100 and the setting device 200 of the remote manipulation system 1000 according to embodiment 2 are of the same as that of FIG. 1. The description below highlights a difference from embodiment 1.

Figures 5, 6:
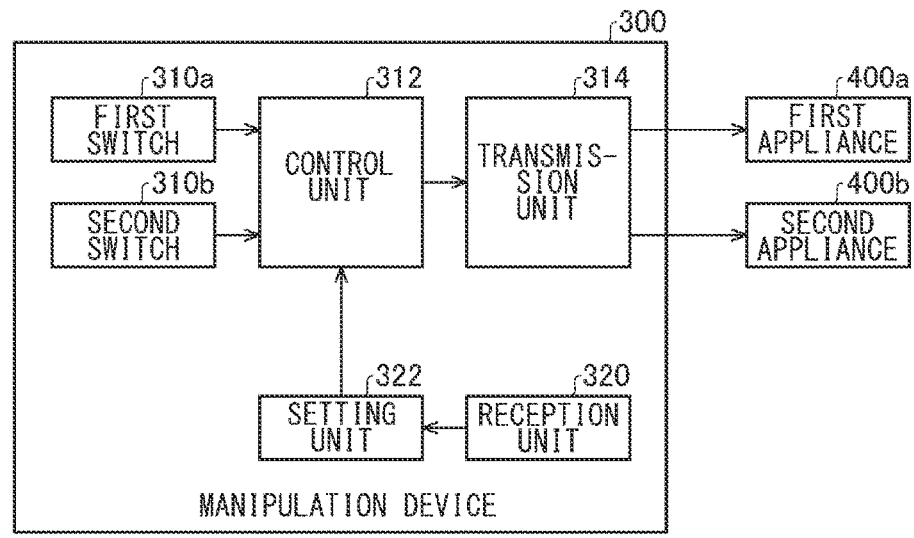
FIG. 5 shows a configuration of the remote manipulation system according to embodiment 2.
FIG. 6 shows a data structure of a stable stored in the storage unit according to embodiment 2.

FIG. 5 shows a configuration of the remote manipulation system 1000. The remote manipulation system 1000 includes the manipulation device 300, and a first appliance 400a and a second appliance 400b, which are generically referred to as appliances 400. The manipulation device 300 includes a first switch 310a and a second switch 310b, which are generically referred to as switches 310, the control unit 312, the transmission unit 314, the reception unit 320, and the setting unit 322. The terminal device 100 and the setting device 200 are not shown in FIG. 5 but they are included in the remote manipulation system 1000 as in FIG. 1.

(1) Basic Operation

The manipulation device 300 includes the first switch 310a and the second switch 310b that can accept manipulation from the manipulator. The number of switches 310 is not limited to "2". The first switch 310a is the switch 310 for manipulating the first appliance 400a, and the second switch 310b is the switch 310 for manipulating the second appliance 400b. In other words, the switches 310 are provided to manipulate mutually different appliances 400. The manipulator pushes the first switch 310a down to manipulate the first appliance 400a and pushes the second switch 310b to manipulate the second appliance 400b. When each switch 310 detects a push-down operation, the switch 310 notifies the control unit 312 of the push-down operation.

When notified of the push-down operation, the control unit 312 generates a wireless signal for controlling the appliance 400. The format of the wireless signal is the same as that of embodiment 1. When notified that the first switch 310a is pushed down, the control unit 312 includes the second identification information on the first appliance 400a and the command information for the first appliance 400a in the wireless signal. When notified that the second switch 310b is pushed down the control unit 312 includes the second identification information on the second appliance 400b and the command information for the second appliance 400b in the wireless signal. In either case, the control unit 312 includes the first identification information on the manipulation device 300 in the wireless signal. The control unit 312 outputs the wireless signal to the transmission unit 314, and the transmission unit 314 transmits the wireless signal.

The first appliance 400a and the second appliance 400b receive the wireless signal from the manipulation device 300. The communication unit 410 (not shown) of each appliance 400 acquires the first identification information, the second identification information, and the command information from the wireless signal and outputs the first identification information, the second identification information, and the command information to the control unit 412 (not shown). The control unit 412 stores the first identification information and the second identification information in advance and controls the operation of the appliance 400 in accordance with the command information when the first identification information and the second identification information stored in advance match the first identification information and the second identification information received from the communication unit 410.

(2) Setting Operation

The terminal device 100 and the setting device 200 are configured in a manner similar to that of FIG. 1. The setting personnel inputs at least one of the first identification information, the second identification information, or the command information that should be changed in the terminal device 100. In that process, the information on the switch 310 and the appliance 400 subject to change is also input. The terminal device 100 transmits a registration request including these items to the setting device 200.

The input unit 210 of the setting device 200 receives the registration request from the terminal device 100. This is equivalent to receiving command information for each switch 310. As in the embodiment described above, the storage unit 212 stores the registration information already registered and the first identification information related to the registration information. FIG. 6 shows a data structure of a stable stored in the storage unit 212. As shown in the figure, the registration information and the first identification information are associated with each other, and the second identification information and the command information for the respective switches 310 and the respective appliances 400 are also associated with each other. The processes in the authentication unit 214 and the control unit 216 for the table stored in the storage unit 212 are the same as those described above. As a result, the output unit 218 transmits a setting signal including the command information for each switch 310 to the manipulation device 300.

The reception unit 320 of the manipulation device 300 of FIG. 5 receives the setting signal from the setting device 200. The setting unit 322 sets, in the control unit 312, the first identification information, and the second identification information and the command information for each switch 310 thus received. The control unit 312 uses the first identification information, and the second identification information and the command information for each switch 310 in the basic operation. In the case the first identification information or the second identification information for each switch 310 is changed, the first identification information or the second identification information for each switch 310 in the control unit 412 of the appliance 400 is also changed. A publicly known technology may be used to effect this change so that a description thereof is omitted.

According to this embodiment, the command information for each switch 310 is output to the manipulation device 300 when the command information for each switch 310 is received. Therefore, even if the manipulation device 300 includes a plurality of switches 310, the setting of the switches can be changed. Further, the setting of each of the plurality of switches 310 is changed so that the flexibility of control by the manipulation device 300 can be expanded.

A summary of an embodiment of the present disclosure is given below. The manipulation device 300 includes a plurality of switches that can accept manipulation from the manipulating personnel, the input unit 210 receives the command information for each switch 310, and the output unit 218 outputs the command information for each switch 310 to the manipulation device 300.

Third Embodiment

A description will now be given of embodiment 3. Like the foregoing embodiments, embodiment 3 relates to a remote manipulation system. The manipulation device in embodiments 1 and 2 directly transmits a wireless signal to one or more appliances. In embodiment 3, on the other hand, one or more appliances are connected to a control device. The manipulation device transmits a wireless signal to the control device, and the control device controls the one or more appliances. The control device like this is included in an energy management system (EMS). An energy management system displays electric consumption of the appliances in the residence or controls the operation of the appliances from a remote place. A communication protocol is introduced in the energy management system. One such communication protocol ECHONETLite (registered trademark) defines an appliance class for each type of appliance and defines, as properties, information maintained in the appliance and a target of control for each appliance class. The description below highlights a difference from the foregoing embodiments.

Figure 7:
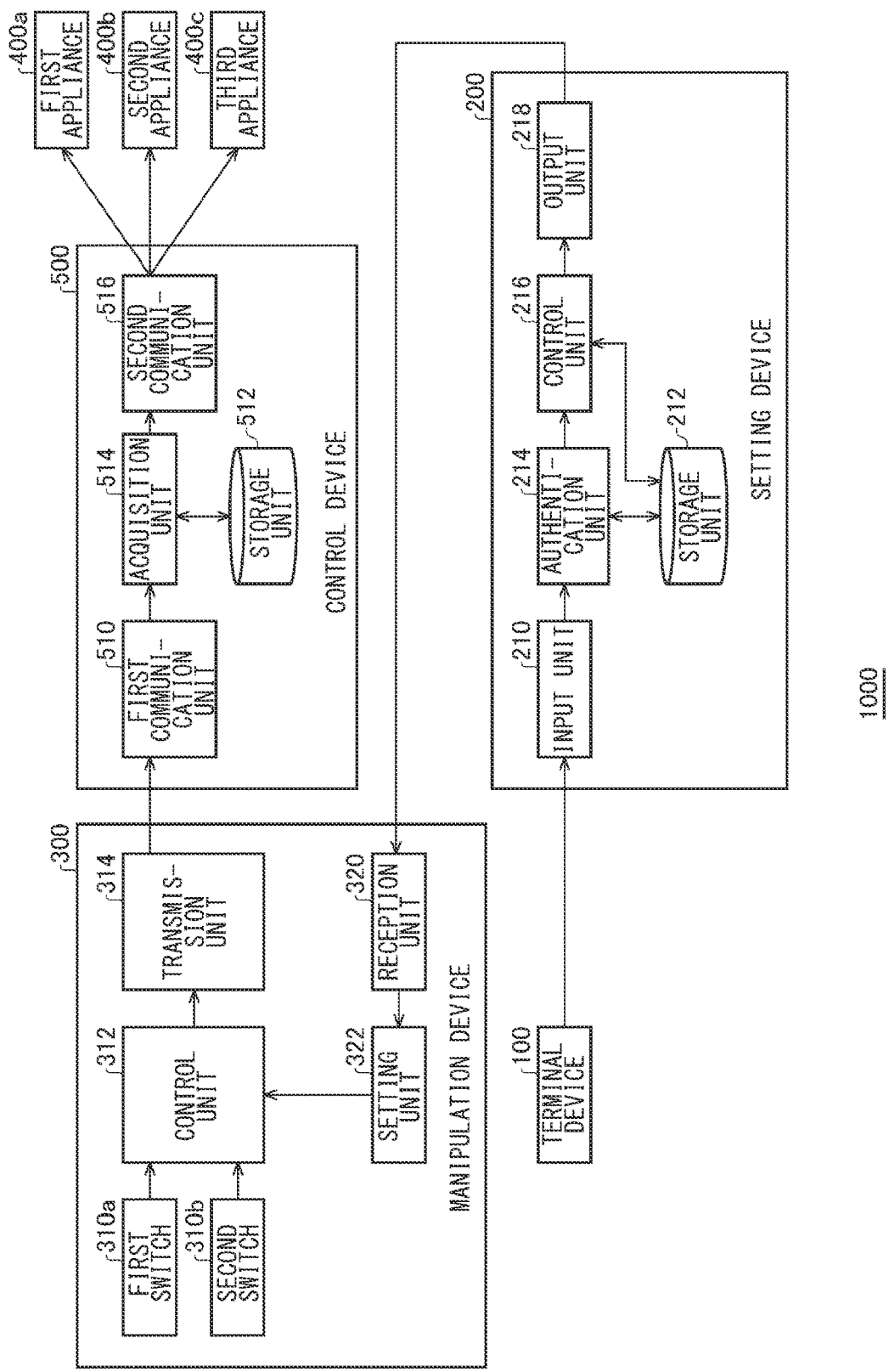
FIG. 7 shows a configuration of the remote manipulation system according to embodiment 3.

FIG. 7 shows a configuration of the remote manipulation system 1000. The remote manipulation system 1000 includes the terminal device 100, the setting device 200, the manipulation device 300, the appliance 400, and a control device 500. The control device 500 includes a first communication unit 510, a storage unit 512, an acquisition unit 514, and a second communication unit 516. The setting device 200 is configured in a manner similar to that of FIG. 1, and the manipulation device 300 is configured in a manner similar to that of FIG. 5. In the remote manipulation system 1000, "mode" is defined as a concept to control a plurality of appliances collectively. For example, the "on" state of the first appliance 400a, the "on" state of the second appliance 400b, and the "on" state of the third appliance 400c are set in the first mode. The "off" state of the first appliance 400a, the "off" state of the second appliance 400b, and the "on" state of the third appliance 400c are set in the second mode. Modes such as these may be associated with various scenes. For example, the first mode is associated with "at the time of awakening", and the second mode is associated with "at the time of returning home".

(1) Basic Operation

The manipulation device 300 includes the first switch 310a and the second switch 310b that can accept manipulation from the manipulator. The number of switches 310 is not limited to "2". The first switch 310a is the switch 310 for selecting the first mode, and the second switch 310b is the switch 310 for selecting the second mode. In other words, each switch 310 is provided to select a mode of the appliance 400. The manipulator pushes the first switch 310a down to select the first mode and pushes the second switch 310b to select the second mode. When each switch 310 detects a push-down operation, the switch 310 notifies the control unit 312 of the push-down operation.

When notified of the push-down operation, the control unit 312 generates a wireless signal for controlling the plurality of appliances 400. FIG. 8 shows a format of the wireless signal in the remote manipulation system 1000. As shown in the figure, the wireless signal includes the first identification information, the second identification information, and mode identification information. It should be noted here that the second identification information is not information for identifying the appliance 400 but information for identifying the control device 500. The mode identification information is information for indicating the mode selected in the switch 310. For example, the first mode identification information indicates the first mode or the second mode. Reference is made back to FIG. 1. The control unit 312 outputs the wireless signal to the transmission unit 314, and the transmission unit 314 transmits the wireless signal.

The control device 500 controls the plurality of appliances 400 based on the wireless signal from the manipulation device 300 that has accepted manipulation from the manipulating personnel. The first communication unit 510 of the control device 500 is compatible with the same communication scheme as that of the transmission unit 314 of the manipulation device 300 and receives the wireless signal from the manipulation device 300. The first communication unit 510 acquires the first identification information, the second identification information, and the mode identification information from the wireless signal and outputs the first identification information, the second identification information, and the mode information to the acquisition unit 514.

The storage unit 512 stores a table for the first identification information, the second identification information, and the mode identification information. FIG. 9 shows a data structure of a table stored in the storage unit 512. The table illustrated is a table for the first identification information "L1" and the second identification information "M1". A further table may be stored in the storage unit 512 for further first identification information. The table lists the operation "N1" of the first appliance 400a, the operation "O1" of the second appliance 400b, and the operation "P1" of the third appliance 400c in the first mode. The table also lists the operation "N2" of the first appliance 400a, the operation "O2" of the second appliance 400b, and the operation "P2" of the third appliance 400c in the second mode. In the example mentioned above, N1 indicates "on", O1 indicates "on", P1 indicates "on", N2 indicates "off", O2 indicates "off", and P2 indicates "on". Reference is made back to FIG. 7.

The acquisition unit 514 compares the first identification information and the second identification information in the table stored in the storage unit 512 with the first identification information and the second identification information received from the first communication unit 510. If a match is not found in at least one of the types of information, the acquisition unit 514 terminates the process. This represents an operation performed when the wireless signal is received from the manipulation device 300 that is not set in advance. When a match is found in both of the two types of information, on the other hand, the acquisition unit 514 acquires the detail of control of the respective appliances 400 from the table stored in the storage unit 512 based on the mode identification information received from the communication unit 410. When the mode identification information indicates "first mode", for example, the acquisition unit 14 acquires the operation "N1" of the first appliance, the operation "O1" of the second appliance 400b, and the operation "P1" of the third appliance 400c. These operations may be presented as command information. It can therefore be said that the acquisition unit 514 acquires the command information for each of the plurality of appliances 400, based on the first identification information, the second identification information, and the mode information included in the wireless signal received in the first communication unit 510. The acquisition unit 514 outputs the command information for each of the plurality of appliances 400 to the second communication unit 516.

The second communication unit 516 has a communication function compatible with ECHONETLite (registered trademark) and transmits the command information to each appliance 400. For example, the second communication unit 516 transmits the command information indicating the operation "N1" to the first appliance 400a, transmits the command information indicating the operation "O1" to the second appliance 400b, and transmits the command information indicating the operation "P1" to the third appliance 400c. Each appliance 400 performs an operation determined by the command information received from the second communication unit 516.

(2) Setting Operation

The setting personnel inputs at least one of the first identification information or the second identification information that should be changed in the terminal device 100. The terminal device 100 transmits a registration request including these items to the setting device 200.
The input unit 210 of the setting device 200 receives the registration request from the terminal device 100. As in the embodiments described above, the storage unit 212 stores the registration information already registered and the first identification information related to the registration information. The processes in the authentication unit 214 and the control unit 216 for the table stored in the storage unit 212 are the same as described above. As a result, the output unit 218 transmits a setting signal including the combination of the first identification information and the second identification information received in the input unit 210 to the manipulation device 300.

The reception unit 320 of the manipulation device 300 receives the setting signal from the setting device 200. The setting unit 322 sets the first identification information and the second identification information thus received in the control unit 312. The control unit 312 uses the first identification information and the second identification information in the basic operation. In the case the first identification information or the second identification information is changed, the first identification information or the second identification information in the storage unit 512 of the control device 500 is also changed. A publicly known technology may be used to effect this change so that a description thereof is omitted.

According to this embodiment, the command information for each of the plurality of appliances 400 is acquired based on the first identification information and the second identification information included in the wireless signal, and the command information is transmitted to the respective appliances 400. Therefore, the plurality of appliances 400 can be controlled by using one wireless signal. Further, the command information for each of the plurality of appliances 400 is acquired based on the mode identification information included in the wireless signal, and the command information is transmitted to the respective appliances 400 so that the plurality of appliances 400 can be controlled by using one wireless signal. Further, the combination of the first identification information and the second identification information is output to the manipulation device 300 when the authentication process on the received registration is successful. Therefore, at least one of the first identification information or the second identification information in the manipulation device 300 can be changed. Further, at least one of the first identification information or the second identification information in the manipulation device 300 is changed when the authentication process on the received registration is successful so that the security of the manipulation device 300 is improved. Further, the setting in the manipulation device 300 is changed in accordance with the setting signal output from the setting device 200. Therefore, the flexibility of control by the manipulation device 300 can be expanded, while at the same time the configuration of the manipulation device 300 is inhibited from becoming complicated.

A summary of an embodiment of the present disclosure is given below. Another embodiment of the present disclosure relates to a control device 500. The device is a control device 500 adapted to control a plurality of appliances 400 based on a wireless signal from a manipulation device 300 that accepts manipulation from a manipulating personnel, including: a first communication unit 510 that receives from the manipulation device 300 the wireless signal including first identification information for identifying the manipulation device 300 and second identification information for identifying the control device 500; an acquisition unit 514 that acquires command information for each of the plurality of appliances 400 based on the first identification information and the second identification information included in the wireless signal received in the first communication unit 510; and a second communication unit 516 that transmits, to each of the plurality of appliances 400, the command information acquired in the acquisition unit 514 and provided for each of the plurality of appliances 400.

The wireless signal received in the first communication unit 510 includes mode identification information for identifying a mode, and the acquisition unit 514 acquires the command information corresponding to the mode identification information included in the wireless signal received in the first communication unit 510 and provided for each of the plurality of appliances 400.

A setting device 200 for setting the manipulation device 300 that should transmit the wireless signal to the control device, that may include: an input unit 210 that receives the first identification information, the second identification information, and registration information for identifying a setting personnel; an authentication unit 214 that performs an authentication process on the registration information received in the input unit 210; and an output unit 218 that outputs a combination of the first identification information and the second identification information received in the input unit 210 to the manipulation device 300 when the authentication process in the authentication unit 214 is successful.

Given above is a description of the present disclosure based on an exemplary embodiment. The embodiment is intended to be illustrative only and it will be understood by those skilled in the art that various modifications to constituting elements and processes could be developed and that such modifications are also within the scope of the present disclosure.

In embodiments 1 through 3, the terminal device 100 and the setting device 200 are included. Alternatively, however, the setting device 200 may be included in the terminal device 100. According to this variation, the flexibility in the configuration is improved.

In embodiments 1 and 2, the wireless signal includes command information. Alternatively, however, the wireless signal may not include command information when the detail of control in the appliance 400 is predefined. According to this variation, the flexibility in the configuration is improved.

In embodiment 3, a plurality of switches 310 are provided in the manipulation device 300. Alternatively, however, one switch 310 may be provided in the manipulation device 300. In that case, the wireless signal may not include mode identification information. According to this variation, the flexibility in the configuration is improved.

INDUSTRIAL APPLICABILITY

According to this disclosure, the flexibility of control by the manipulation device can be expanded, while at the same time the configuration of the manipulation device is inhibited from becoming complicated.

REFERENCE SIGNS LIST 100 terminal device, 200 setting device, 210 input unit, 212 storage unit, 214 authentication unit, 216 control unit, 218 output unit, 300 manipulation device, 310 switch, 312 control unit, 314 transmission unit, 320 reception unit, 322 setting unit, 400 appliance, 410 communication unit, 412 control unit, 1000 remote manipulation system

The invention claimed is:

1. A setting device adapted to set a manipulation device that transmits a wireless signal for controlling an appliance when the manipulation device accepts manipulation from a manipulator, comprising:
    an input unit that, when the manipulation device is set, receives first identification information for identifying the manipulation device, second identification information for identifying the appliance, and registration information for identifying a manipulating personnel;
    an authentication unit that performs an authentication process on the registration information received in the input unit; and
    an output unit that outputs a combination of the first identification information and the second identification information received in the input unit to the manipulation device when the authentication process in the authentication unit is successful, wherein when the appliance is controlled, the wireless signal transmitted from the manipulation device includes the first identification information, the second identification information, and command information for controlling the appliance.

2. The setting device according to claim 1, wherein the input unit receives one of types of command information that can be included in the wireless signal and that should be used, and
    the output unit outputs the command information received in the input unit to the manipulation device when the authentication process in the authentication unit is successful.

3. The setting device according to claim 2, wherein the manipulation device includes a plurality of switches that can accept manipulation from the manipulating personnel,
    the input unit receives the command information for each switch, and
    the output unit outputs the command information for each switch to the manipulation device.

4. A control device adapted to control a plurality of appliances based on a wireless signal from a manipulation device that accepts manipulation from a manipulating personnel, comprising:
    a first communication unit that receives from the manipulation device the wireless signal including first identification information for identifying the manipulation device and second identification information for identifying the control device;
    an acquisition unit that acquires command information for each of the plurality of appliances based on the first identification information and the second identification information included in the wireless signal received in the first communication unit;
    a second communication unit that transmits, to each of the plurality of appliances, the command information acquired in the acquisition unit and provided for each of the plurality of appliances,
    the wireless signal received in the first communication unit includes mode identification information for identifying a mode for controlling the plurality of appliances collectively, and
    the acquisition unit acquires the command information corresponding to the mode identification information included in the wireless signal received in the first communication unit and provided for each of the plurality of appliances.

5. A setting device for setting the manipulation device that should transmit the wireless signal to a control device, comprising:
    an input unit that receives first identification information for identifying the manipulation device, second identification information for identifying the control device, and registration information for identifying a setting personnel;
    an authentication unit that performs an authentication process on the registration information received in the input unit; and
    an output unit that outputs a combination of the first identification information and the second identification information received in the input unit to the manipulation device when the authentication process in the authentication unit is successful, the control device controls a plurality of appliances based on the wireless signal from the manipulation device that is set by the setting device and that accepts manipulation from a manipulating personnel, the control device includes:

a first communication unit that receives from the manipulation device the wireless signal including the first identification information and the second identification information;

an acquisition unit that acquires command information for each of the plurality of appliances based on the first identification information and the second identification information included in the wireless signal received in the first communication unit; and a second communication unit that transmits, to each of the plurality of appliances, the command information acquired in the acquisition unit and provided for each of the plurality of appliances wherein the wireless signal received in the first communication unit includes mode identification information for identifying a mode for controlling the plurality of appliances collectively, and the acquisition unit acquires the command information corresponding to the mode identification information included in the wireless signal received in the first communication unit and provided for each of the plurality of appliances.

6. A non-transitory computer readable storage medium encoded with a program, the program in a setting device adapted to set a manipulation device that transmits a wireless signal for controlling an appliance when the manipulation device accepts manipulation from a manipulator, comprising computer implemented modules including:

a module that receives, when the manipulation device is set, first identification information for identifying the manipulation device, second identification information for identifying the appliance, and registration information for identifying a manipulating personnel;

a module that performs an authentication process on the registration information received; and a module that outputs a combination of the first identification information and the second identification information received to the manipulation device when the authentication process is successful, wherein when the appliance is controlled, the wireless signal transmitted from the manipulation device includes the first identification information, the second identification information, and command information for controlling the appliance.

7. A non-transitory computer readable storage medium encoded with a program, the program in a control device adapted to control a plurality of appliances based on a wireless signal from a manipulation device that accepts manipulation from a manipulator, comprising computer implemented modules including:

a module that receives from the manipulation device the wireless signal including first identification information for identifying the manipulation device and second identification information for identifying the control device;

a module that acquires command information for each of the plurality of appliances based on the first identification information and the second identification information included in the wireless signal received; and a module that transmits, to each of the plurality of appliances, the command information acquired and provided for each of the plurality of appliances, wherein the wireless signal received includes mode identification information for identifying a mode for controlling the plurality of appliances collectively, and the module that acquires the command information corresponding to the mode identification information included in the wireless signal received and provided for each of the plurality of appliances.

* * * * *